(12) United States Patent
Schlater et al.

(10) Patent No.: US 7,188,885 B2
(45) Date of Patent: Mar. 13, 2007

(54) TRIM MOLDING FOR A MOTOR VEHICLE WINDOW PANEL

(75) Inventors: Timothy J. Schlater, Ludlow Falls, OH (US); James R. Biondo, Commerce Township, MI (US)

(73) Assignee: Creative Extruded Products, Inc., Tipp City, OH (US)

( * ) Notice: Subject to any disclaimer, the term of this patent is extended or adjusted under 35 U.S.C. 154(b) by 3 days.

(21) Appl. No.: 10/901,778

(22) Filed: Jul. 29, 2004

(65) Prior Publication Data

US 2006/0022487 A1  Feb. 2, 2006

(51) Int. Cl.
*B60J 10/02* (2006.01)

(52) U.S. Cl. .................... 296/96.21; 296/93

(58) Field of Classification Search .......... 296/96.21, 296/93, 201, 146.15; 52/204.591, 204.597
See application file for complete search history.

(56) References Cited

U.S. PATENT DOCUMENTS 3,807,107 A * 4/1974 Davis
5,154,028 A   10/1992 Hill et al.
5,603,546 A    2/1997 Desir, Sr.
5,669,131 A *  9/1997 Gold
6,279,983 B1   8/2001 Blondo et al.

* cited by examiner

*Primary Examiner*—Stephen Gordon
(74) *Attorney, Agent, or Firm*—Jacox, Meckstroth & Jenkins

(57) ABSTRACT

A motor vehicle window panel has a trim molding formed by an extruded body of plastics material, and the body includes a mounting flange, a locating flange and a vehicle body panel sealing flange. The mounting flange carries a pressure sensitive contact adhesive tape which bonds to an inner surface of the window panel after the locating flange engages an outer edge surface of the window panel. The body is preferably extruded with a weakened zone at the base of the locating flange to permit convenient tear removal of the locating flange either before or after the molding and window panel are attached to the vehicle body panel. The sealing flange may be extruded with a lower durometer material, and an internal reinforcement strip and a spacer flange may be extruded with the mounting flange. The locating flange may be curved or flat with a projecting lip to facilitate removal.

7 Claims, 4 Drawing Sheets

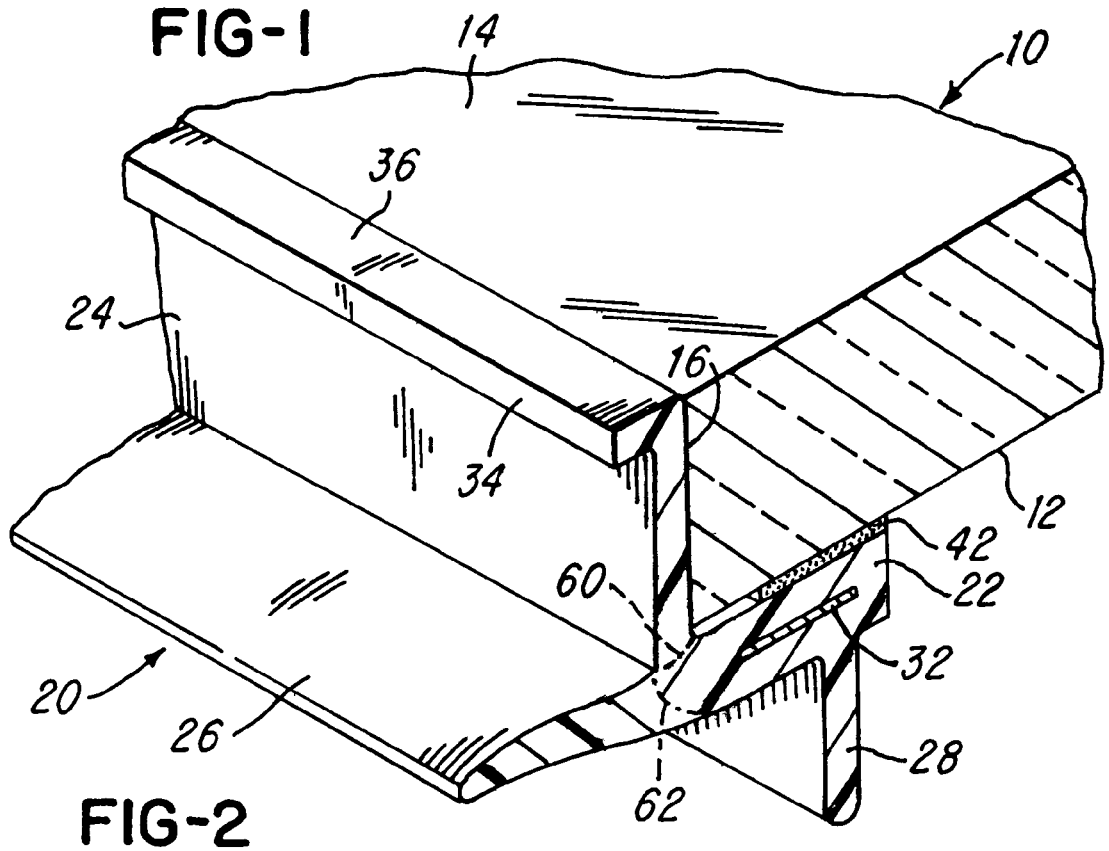
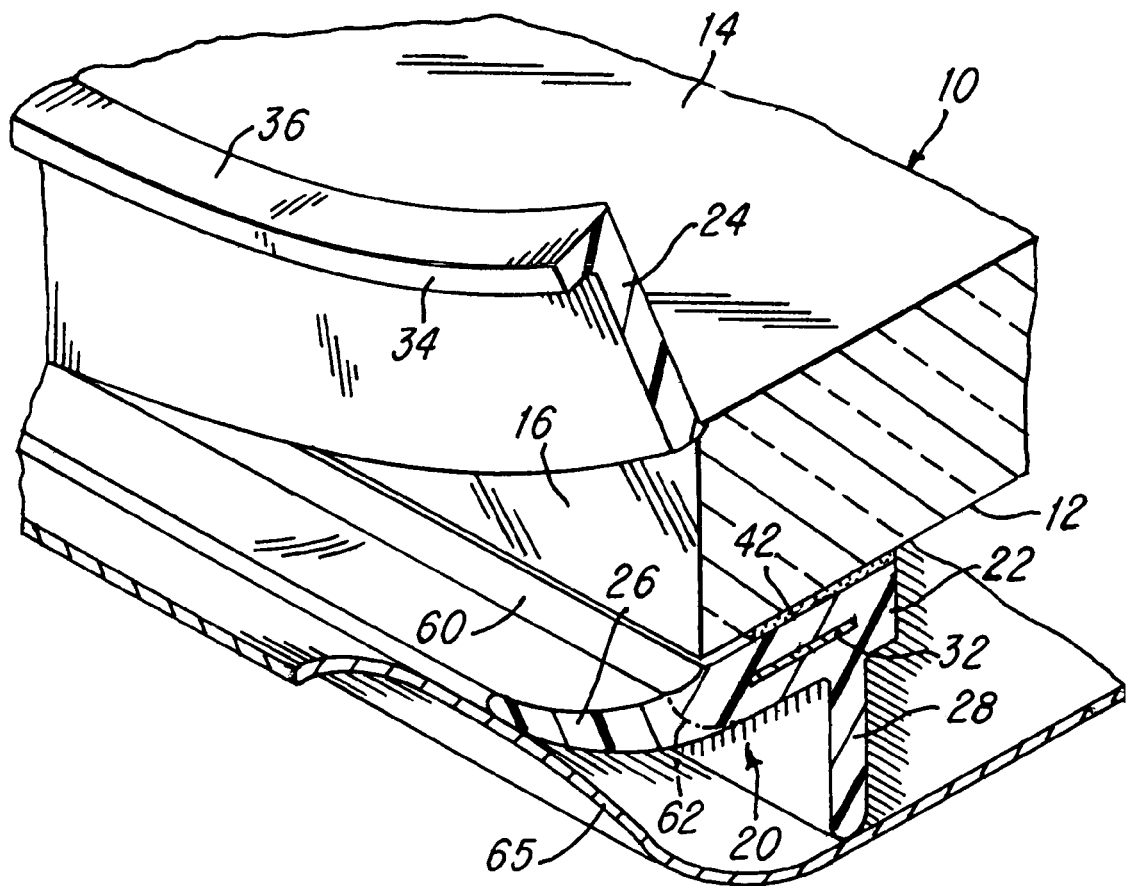

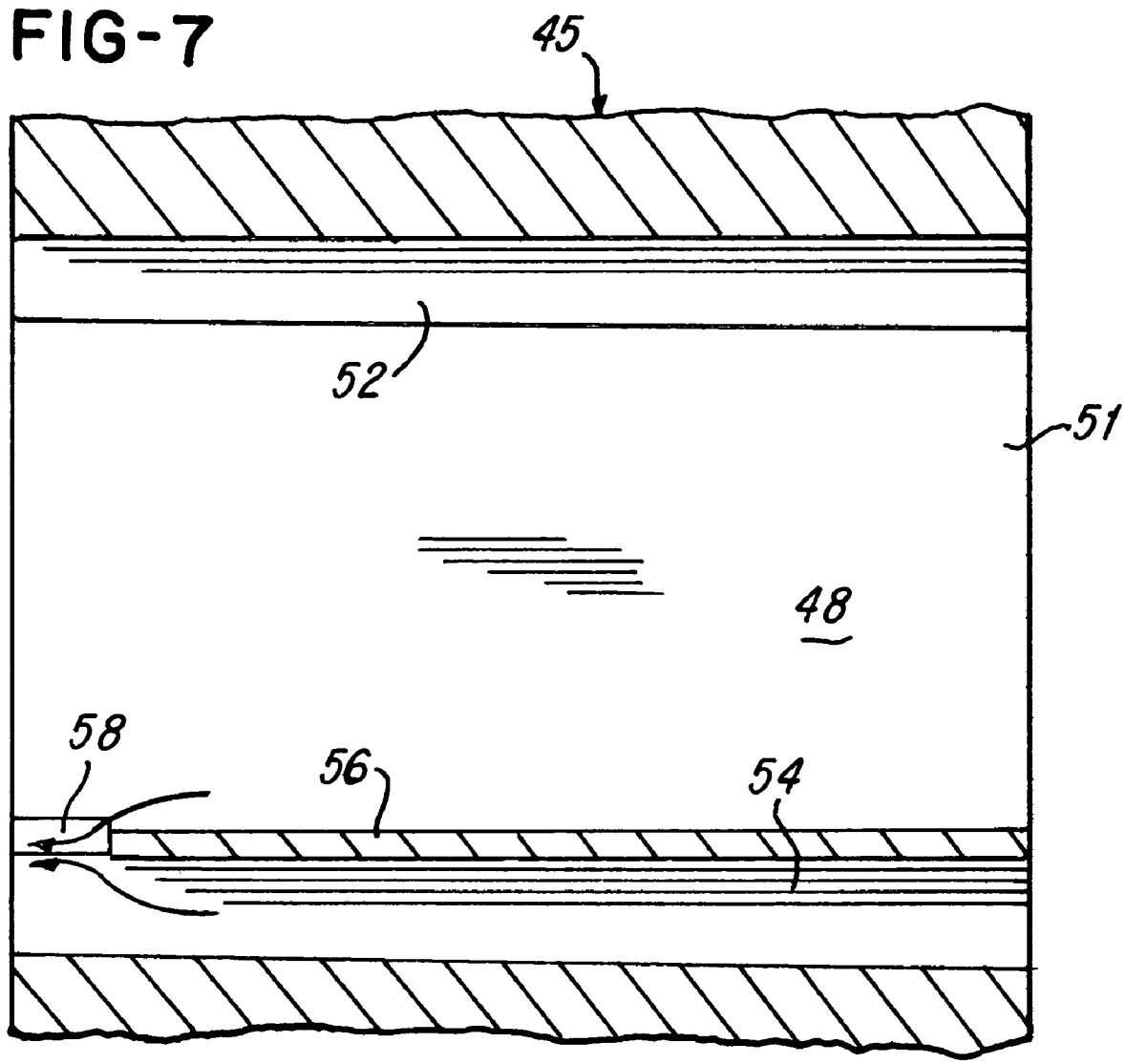

TRIM MOLDING FOR A MOTOR VEHICLE WINDOW PANEL

BACKGROUND OF THE INVENTION

This invention relates to an extruded elastomeric or plastic trim molding which extends around the peripheral edge portion of a glass window panel as used in a motor vehicle, and of the general type disclosed in U.S. Pat. No. 6,279,983 which issued to the assignee of the present invention and the disclosure of which is herein incorporated by reference. Such window moldings are commonly installed on the peripheral edge portion of a glass window panel to support the panel and form a seal or closeout between the edge portion of the window panel and the metal or composite body panel of the motor vehicle or to form a protection for an exposed edge portion of a window panel. In some installations, it is desirable for the molding to form a closeout while exposing the peripheral edge surface of the window panel, for example, as disclosed in U.S. Pat. No. 5,154,028.

In the '028 patent, the molding is extruded with a flexible flange which projects laterally outwardly from the outer edge surface of the glass panel to full the gap between the outer edge surface of the window panel and the vehicle body panel and to form a fluid-tight seal with the body panel. In other installations, the trim molding not only fills the gap between the outer edge of the window panel and the body panel, but also has an outer planar surface which is flush with the outer surface of the window panel and the body panel, for example, as disclosed in U.S. Pat. No. 5,603,546.

The molding disclosed in U.S. Pat. No. 6,279,983 provides for installing the molding on the peripheral edge portion of the window panel without the use of expensive fixtures, for example, fixtures as disclosed in above-mentioned U.S. Pat. No. 5,603,546. The molding in the '983 patent is installed on the window panel by fitting or sliding the U-shaped channel portion of the molding onto the edge portion of the window panel after a time-cured adhesive is applied to an inner peripheral surface of the window panel and a primer is applied to an inner flange portion of the molding. After the adhesive cures, which may require 30 to 40 minutes, the outer flange portion and the connecting portion are removed from the inner flange portion and from the flexible sealing flange portion which engages the vehicle body panel. However, the equipment and time required for precisely applying the adhesive to the peripheral inner surface of the window panel and the time required for allowing the adhesive to cure after the channel portion is pressed onto the peripheral edge portion of the window panel, results in adding significant time to the total time required for installing the molding onto the window panel.

SUMMARY OF THE INVENTION

The present invention is directed to an improved extruded molding of the general type disclosed in above-mentioned U.S. Pat. No. 6,279,983 and which substantially reduces the time and eliminates equipment or fixtures for installing the molding on the peripheral edge portion of a window panel. The molding of the invention also provides for either partially or fully exposing the outer edge surface of the window panel after it is installed on a vehicle body panel. In accordance with the invention, a window molding is extruded of an elastomeric or plastics material and includes a mounting flange, a locating flange and a projecting flexible closeout flange. A double-sided pressure sensitive contact adhesive tape is continuously attached to the mounting flange while the extruded molding is still moving longitudinally, and the tape carries a removable protective plastic strip until the molding is ready to be installed. The locating flange of the molding is removable from the mounting flange and the sealing flange, preferably at a weakened tear zone so that the locating flange may be manually torn and peeled from the mounting flange. This tear zone may be formed during the extruding process by merging the extruded plastics material together in the final extrusion die or by mechanical design.

The molding of the invention may be easily and quickly attached to the peripheral edge portion of the window panel. After the window panel is placed on a table with the inner surface of the panel facing upwardly. The protective strip is peeled from the adhesive tape, and the locating flange is placed against the outer edge surface of the window panel to locate the molding laterally on the peripheral edge portion of the window panel. The molding is then slid and pressed downwardly so that the contact adhesive tape contacts the inner surface of the window panel and quickly bonds the molding to the window panel.

The locating flange may be removed after the mounting flange is attached or may remain with the molding until after the window panel is installed within a metal or composite vehicle body panel in order to protect the outer edge surface of the window panel. The locating flange of the molding is removed preferably by pulling and tearing the locating flange from the mounting flange around the periphery of the window panel. This partially or fully exposes the outer edge surface of the window panel, and the outer surface of the window panel is substantially flush with the metal body panel.

Other features and advantages of the invention will be apparent from the following description, the accompanying drawings and the appended claims.

BRIEF DESCRIPTION OF THE DRAWINGS

FIG. 1 is an enlarged fragmentary perspective view of a molding constructed in accordance with the invention and installed or mounted on the peripheral edge portion of a glass window panel in accordance with the invention;

FIG. 2 is a fragmentary perspective view similar to FIG. 1 and showing the window panel and attached molding installed on a vehicle body panel and with the locating flange portion being removed;

FIG. 7 is a fragmentary section through the enlarged die plate shown in FIG. 6 and taken generally on the line 7—7 in FIG. 6.

DESCRIPTION OF THE PREFERRED EMBODIMENTS

Figure 3:
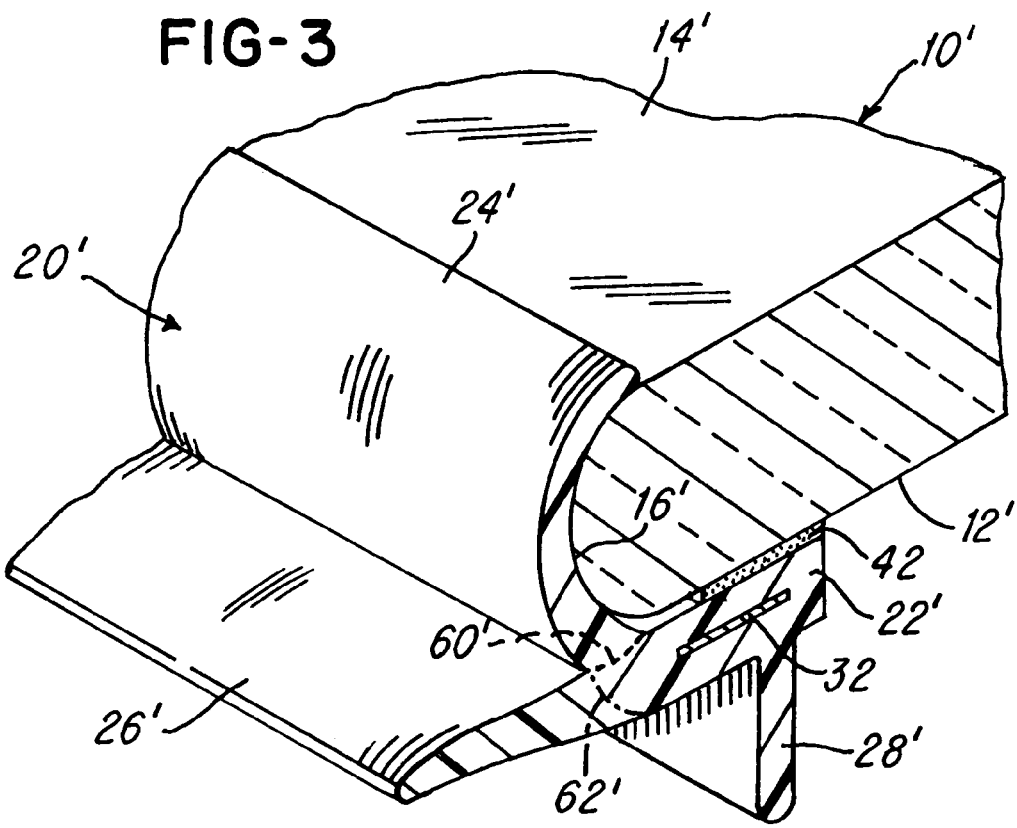
FIGS. 3 and 4 are enlarged fragmentary perspective views similar to FIGS. 1 and 2 and showing a modification of a molding constructed and installed in accordance with the invention for use with a window panel having a rounded outer edge surface.

Referring to FIG. 1, a glass window panel 10 shown enlarged about 5 times and as commonly used on a motor vehicle, is usually generally rectangular and has rounded corners (not shown). The window panel has an inner surface 12 and a parallel outer surface 14 and a peripheral edge surface 16 which may have rounded corners and usually extends perpendicular or normal to the surfaces 12 and 14. In accordance with the present invention, a window trim lace or molding 20, shown enlarged about 5 times, is extruded of an elastomeric or plastics material, such as polyvinylchloride, and includes a mounting flange portion or flange 22, a locating flange portion or flange 24 and a flexible sealing flange portion or flange 26. A spacer flange portion or flange 28 is extruded as an integral part of the molding 20 and may project inwardly from the mounting flange 22 in a direction opposite to the locating flange 24.

Preferably, the mounting flange 22 is extruded with a flat length stabilizing strip 32, for example, in the form of an aluminum foil strip. The locating flange 24 may be extruded with a projecting lip portion 34 and an outer flat surface 36 which may be flush with the outer surface 14 of the window panel 10 after the molding 20 is installed on the window panel. Preferably, after the molding 20 is extruded and cooled and is moving, a double sided contact adhesive tape layer 42 is applied to the outer surface of the mounting flange 22 of the molding 20, and the exposed side of the tape layer 42 is provided with a peel-away or strippable protective plastic strip (not shown) which is carried by the outer side of the contact adhesive tape layer 42 until the molding 20 is ready to be installed on the inner surface 12 of the window panel 10. One form of suitable double back adhesive tape is an acrylic foam adhesive tape produced by 3M Corporation.

Figure 5:
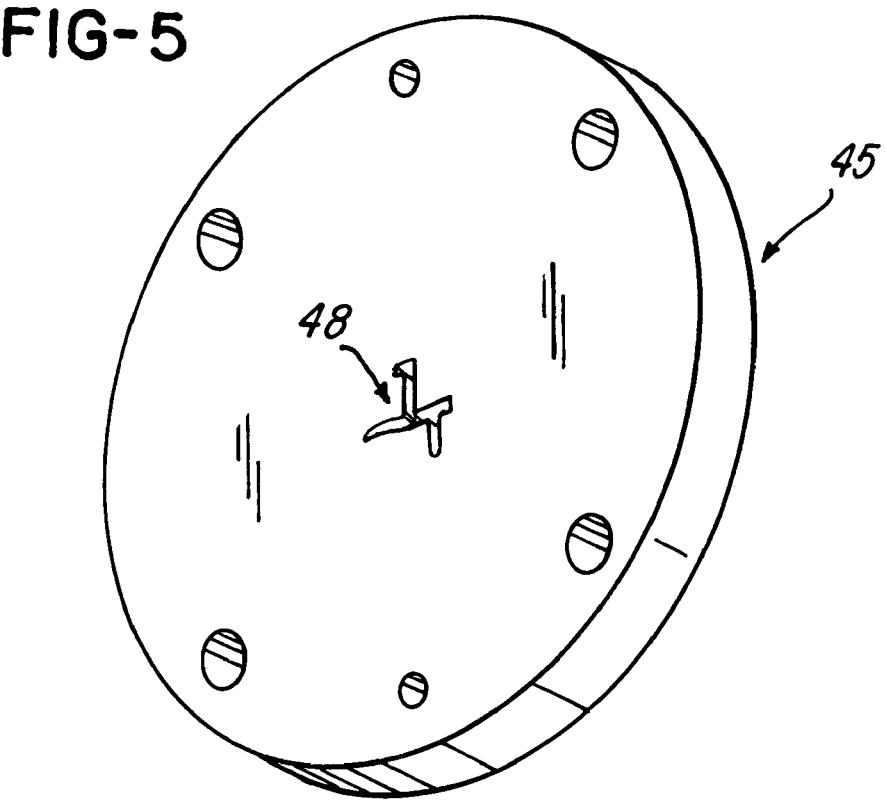
FIG. 5 is a perspective view of a final extrusion die plate having a cavity for producing or extruding the molding shown in FIG. 1.
Figure 6:
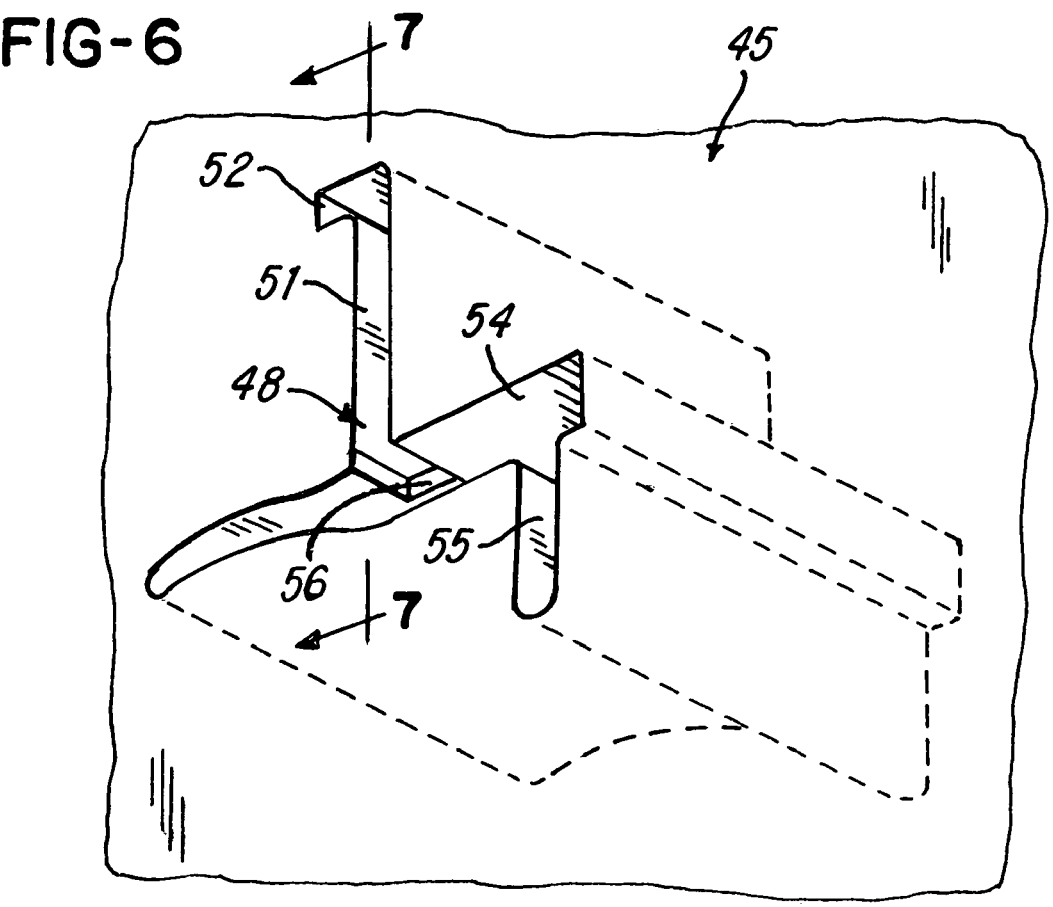
FIG. 6 is an enlarged fragmentary perspective view of the die cavity shown full size in FIG. 5.

Referring to FIGS. 5–7, the molding 20 is extruded through a final circular die plate 45 having a center cavity 48 which corresponds with the profile of the molding 20. The extrusion die plate 45 has an extrusion passage 51 for the locating flange 24 and an extension 52 of the passage 51 forms the lip 34. A passage 54 forms the mounting flange 22, and a passage 55 forms the spacer flange 28. The passages 51 and 54 within the die plate 45 are separated by a thin wall portion 56 (FIG. 7) until the discharge end portion of the die plate 45 where a recess or cavity 58 is formed. The extruded plastics material flowing through the passages 51 and 54 merge or flow together within the cavity 58 to produce a weak connection or a weakened tear zone 60 (FIG. 1) within the molding 20. The molding may also be extruded with a thin section connecting the locating flange to the mounting flange to form a weakened tear zone. The molding 20 may also be extruded with a dual durometer with the mounting flange 22, locating flange 24 and spacer flange 28 having a durometer within the range of 85 to 95 Shore A, and the flexible sealing flange 26 may be extruded with a lower durometer within the range of 65 to 95 Shore A in order to provide the sealing flange 26 with slightly more flexibility. The junction of the two durometers would be in a zone 62 (FIGS. 1 & 2).

The trim molding 20 may be quickly and easily attached to the inner surface 12 of the window panel 10 simply by placing the window panel on a support or table with the edge portion of the window panel exposed or projecting from the support. The thin plastic protective strip on the adhesive foam tape layer 42 is peeled off the contact adhesive layer 42, and the locating flange 24 is progressively placed in contact with the outer edge surface 16 of the window panel 10 to position the molding 20 precisely and laterally with respect to the window panel. The adhesive layer 42 is then progressively pressed into contact with the inner surface 12 as the locating flange 24 slides downwardly while in contact with the edge surface 16. After the molding 20 is progressively attached around the periphery of the window panel 10, the window panel with the attached molding 20 is immediately ready to be handled as a sub-assembly since the contact adhesive layer 42 requires little or no curing time. The sub-assembly is also ready to be installed on a vehicle body panel such as the sheet metal body panel 65 shown in FIG. 2.

The sub-assembly of the window panel 10 and surrounding molding 20 is installed on the body panel 65, for example, by an adhesive strip as disclosed in above-mentioned U.S. Pat. No. 6,279,983. The locating flange 24 is removed either before or after the window panel is installed simply by gripping the projecting lip 34 of the flange 24 and progressively pulling outwardly to sever or tear the locating flange 24 from the mounting flange 22 along the weakened tear zone 60, as shown in FIG. 2. After the locating flange 24 is removed around the periphery of the window panel 10, the outer edge surface 16 of the window panel 10 is exposed, and the sealing flange 26 closes the small gap between the vehicle body panel 65 and the outer edge surface 16 of the window panel 10.

Figure 4:
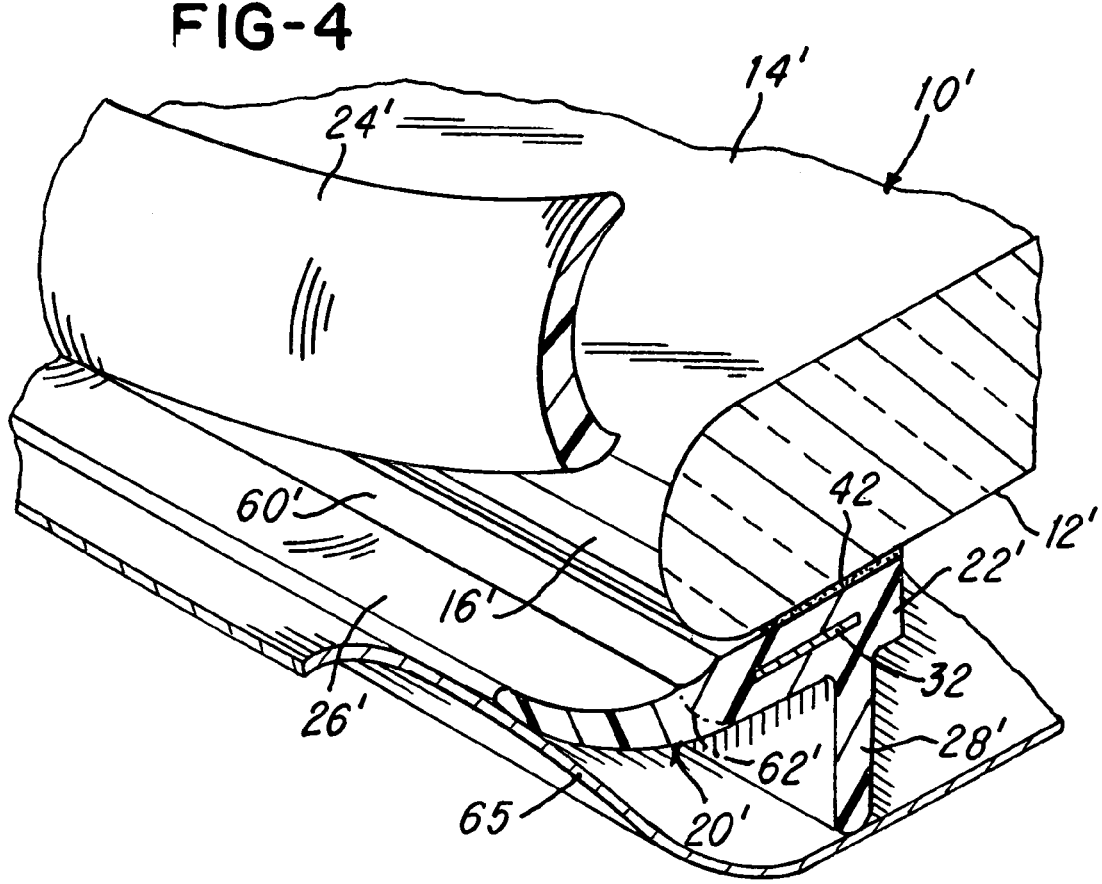

FIGS. 3 and 4 show a modification of the window panel and trim molding shown in FIGS. 1 and 2 and accordingly, the corresponding components are identified with the same reference numbers but with the addition of prime marks. Thus in the embodiment of FIGS. 3 and 4, the window panel 10' has an inner surface 12' and an outer surface 14', but with a rounded outer edge surface 16'. An extruded trim molding 20' has a body with a mounting flange 22', a spacer flange 28' and a tail or sealing flange 26'. The molding 20' also has a curved or arcuate locating flange 24' which mates with the rounded edge surface 16' on the window panel 10'. A weakened tear zone 60' is formed at the base of the locating flange 24' using the same extrusion technique as described above in connection with FIGS. 5–7. The molding 20' is also provided with a reinforcing strip 32 within the mounting flange 22', and a contact adhesive tape layer 42 is carried by the mounting flange 22'.

The extruded trim molding 20' is assembled or attached to the window panel 10' in a manner similar to the procedure described above in connection with FIGS. 1 and 2. That is, after the protective plastic strip is removed from the contact foam adhesive layer 42, the curved locator flange 24' is brought into contact with the rounded edge surface 16' before the contact adhesive layer 42 touches the inner surface 12' of the window panel 10'. The molding 20' is then rolled slightly around the curved or rounded surface 16' until the contact adhesive layer 42 engages the inner surface 12' to form a permanent bond which requires no curing. The sub-assembly of the window panel 10' and the peripherally extending trim molding 20' is mounted on the vehicle body panel 65, either before or after the locating flange 24' is removed by peeling the flange 24' away from the mounting flange 22' at the weakened tear zone 60' to expose the rounded edge surface 16' of the window panel 10'.

From the drawings and the above description, it is apparent that a window trim molding constructed in accordance with the invention provides desirable features and advantages. As one advantage, the molding 20 or 20' may be easily and quickly attached to the window panel 10 or 10' without the use of any fixturing equipment, simply by using the locating flange 24 or 24' to guide the mounting flange 22 or 22' with the attached contact adhesive tape layer 42 into contact and permanent attachment with the inner surface 12 or 12' of the window panel. Either before or after the sub-assembly of the window panel and trim molding has been installed on a vehicle body panel, the locating flange 24 or 24' may be quickly and easily removed to expose the outer edge surface 16 or 16' of the window panel.

While the forms of trim molding and their method of attachment herein described constitutes preferred embodiments of the invention, it is to be understood that the invention is not limited to the precise methods and forms of molding described, and that changes may be made therein without departing from the scope and spirit of the invention as defined in the appended claims.

What is claimed is:

1. A trim molding in combination with a motor vehicle window panel having an inner surface and a parallel outer surface connected by an outer edge surface extending perpendicular to said inner surface and said outer surface, said molding comprising an elongated extruded body of plastics material, said body including a mounting flange, a layer of pressure sensitive contact adhesive on said mounting flange and bonded to said inner surface of said window panel, a removable locating flange integrally connected to said mounting flange and having an inner surface contacting said outer edge surface of said window panel, said locating flange being free to contact and slide onto said outer edge surface of said window panel in a direction perpendicular to said inner surface of said window panel and parallel to said outer edge surface of said window panel and before said adhesive on said mounting flange contacts said inner surface of said window panel for precisely locating said body on said window panel before said adhesive on said mounting flange contacts said inner surface of said window panel, and said mounting flange and said locating flange defining therebetween a weakened tear zone to provide for quickly and efficiently removing said locating flange by tearing said locating flange from said mounting flange immediately after said contact adhesive on the mounting flange contacts said inner surface of said window panel.

2. A trim molding as defined in claim 1 wherein said removable locating flange includes an outer lip portion projecting away from said window panel to facilitate convenient gripping of said locating flange for removing said locating flange.

3. A trim molding as defined in claim 2 wherein said lip portion has an outer end surface substantially flush with said outer surface of said window panel.

4. A trim molding as defined in claim 1 wherein said body includes a spacer flange integrally connected to said mounting flange and projecting from said mounting flange in a direction opposite said locating flange and adapted to engage a vehicle body panel.

5. A trim molding as defined in claim 1 wherein said body includes a longitudinally extending flexible sealing flange projecting laterally outwardly from said weakened tear zone and adapted to engage a motor vehicle body panel.

6. A trim molding in combination with a motor vehicle window panel having an inner surface and a parallel outer surface connected by an outer edge surface extending perpendicular to said inner surface and said outer surface, said molding comprising an elongated extruded body of plastics material, said body including a mounting flange, a layer of pressure sensitive contact adhesive on said mounting flange and bonded to said inner surface of said window panel, a removable locating flange integrally connected to said mounting flange and having an inner surface contacting said outer edge surface of said window panel, said inner surface of said locating flange being contactable with said outer edge surface of said window panel before said adhesive on said mounting flange contacts said inner surface of said window panel for precisely locating said body on said window panel before said adhesive on said mounting flange contacts said inner surface of said window panel, said mounting flange and said locating flange defining therebetween a weakened tear zone to provide for quickly and efficiently removing said locating flange by tearing said locating flange from said mounting flange immediately after said contact adhesive on the mounting flange contacts said inner surface of said window panel, and said weakened tear zone comprises separate extrusions of said plastics material joined together at a cavity outlet of an extrusion die.

7. A trim molding in combination with a motor vehicle window panel having an inner surface and a parallel outer surface connected by an outer edge surface extending perpendicular to said inner surface and said outer surface, said molding comprising an elongated extruded body of plastics material, said body including a mounting flange, a layer of pressure sensitive contact adhesive on said mounting flange and bonded to said inner surface of said window panel, a removable locating flange integrally connected to said mounting flange and having an inner surface contacting said outer edge surface of said window panel, said inner surface of said locating flange being contactable with said outer edge surface of said window panel before said adhesive on said mounting flange contacts said inner surface of said window panel for precisely locating said body on said window panel before said adhesive on said mounting flange contacts said inner surface of said window panel, said mounting flange and said locating flange defining therebetween a weakened tear zone to provide for quickly and efficiently removing said locating flange by tearing said locating flange from said mounting flange immediately after said contact adhesive on the mounting flange contacts said inner surface of said window panel, and said layer of contact adhesive on said mounting flange comprises a double sided foam adhesive tape.

\* \* \* \* \*